Dec. 5, 1961 G. J. WEBSTER 3,011,872
CARBON BLACK FURNACE FLUID INJECTOR
Filed Jan. 28, 1958 2 Sheets-Sheet 1
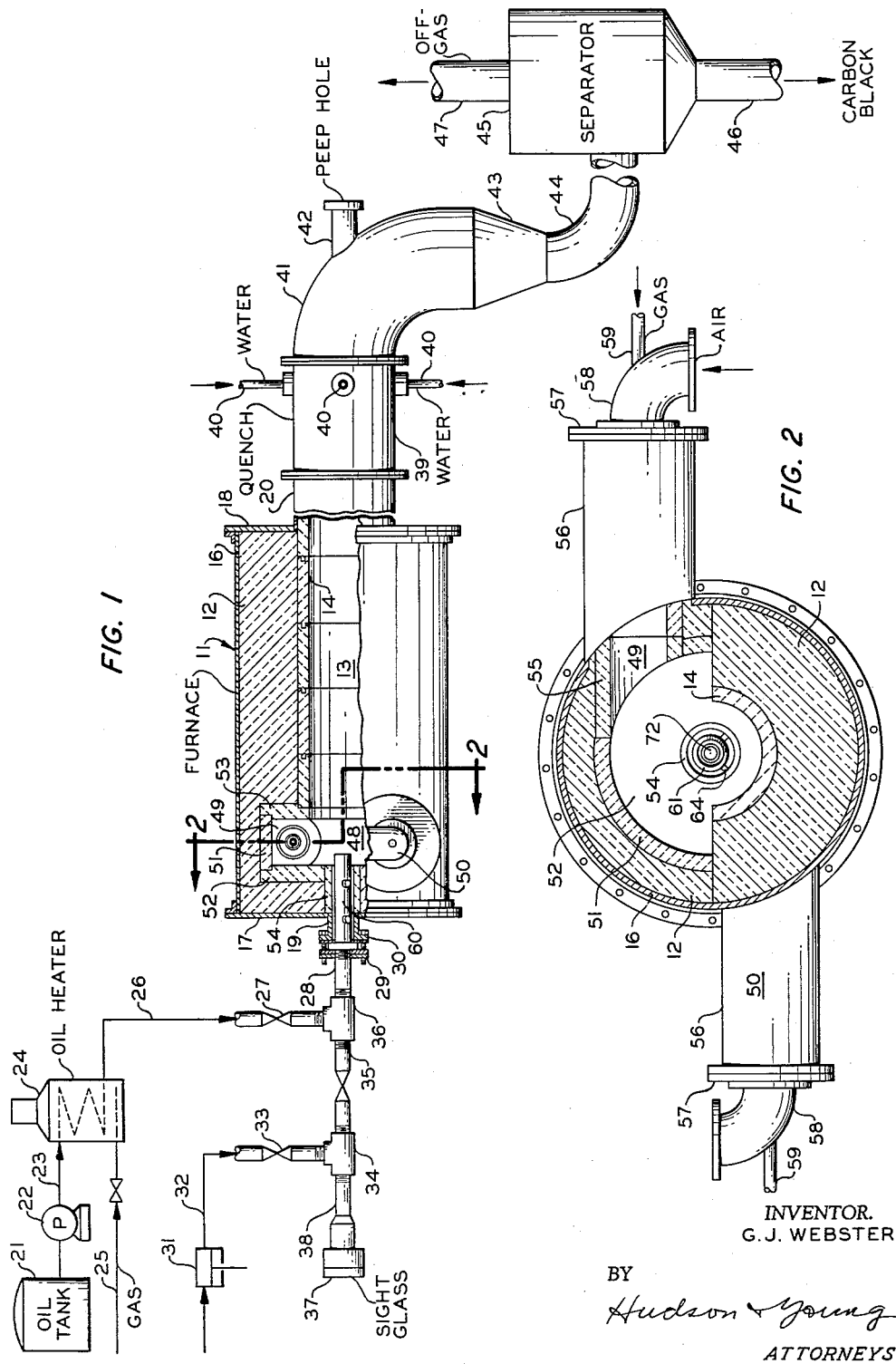
INVENTOR.
G. J. WEBSTER
BY
Hudson & Young
ATTORNEYS Dec. 5, 1961 G. J. WEBSTER 3,011,872
CARBON BLACK FURNACE FLUID INJECTOR
Filed Jan. 28, 1958 2 Sheets-Sheet 2
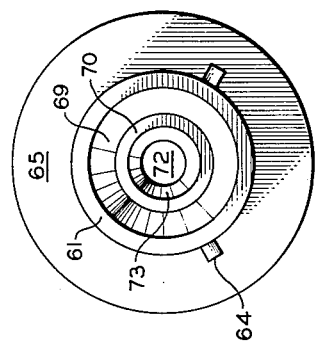
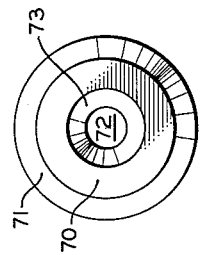
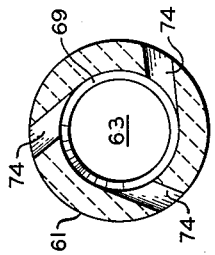
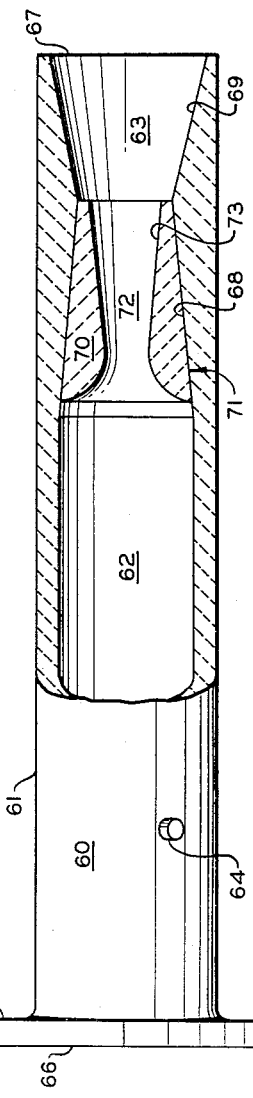
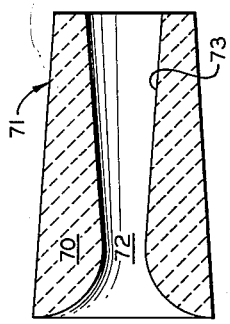
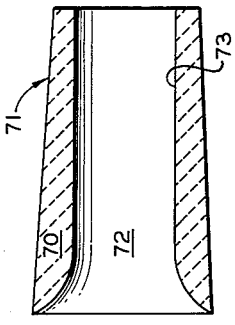
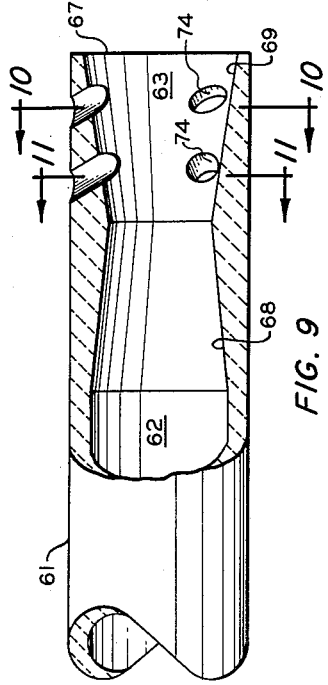
INVENTOR.
G. J. WEBSTER
BY Hudson & Young
ATTORNEYS

United States Patent Office 3,011,872
Patented Dec. 5, 1961

3,011,872
CARBON BLACK FURNACE FLUID INJECTOR
George J. Webster, Charleston, W. Va., assignor to Phillips Petroleum Company, a corporation of Delaware
Filed Jan. 28, 1958, Ser. No. 711,645
19 Claims. (Cl. 23—209.4)

This invention relates to carbon black furnaces. In one aspect, this invention relates to an open end fluid injector for injecting hydrocarbon reactant into a carbon black furnace. In another aspect, this invention relates to means for injecting a substantially vaporized normally liquid hydrocarbon into a carbon black furnace without substantial deposition of coke on either the surfaces of said injector means or the exposed refractory walls of said carbon black furnace. In another aspect, this invention relates to a carbon black furnace having a ceramic hydrocarbon reactant injector means disposed to project into said carbon black furnace from the refractory wall thereof.

In the manufacture of carbon black, as shown by Ayers, Reissue 22,886 (June 3, 1947); Krejci, 2,375,795 (May 15, 1945); Krejci, 2,564,700 (August 21, 1951) and Arnold, 2,617,714 (November 11, 1952), hydrocarbon reactant is injected axially into a refractory lined reaction chamber where it is burned with a deficiency of air to form carbon black. An annular sheath of air is supplied around the metallic pipe through which hydrocarbon gas or vapor is introduced into the interior of the furnace in order to cool the metallic pipe and to blow any unvaporized droplets of hydrocarbon reactant out into the open volume of the furnace. Although the hydrocarbon reactant is pre-heated to approximately 20° beyond its theoretical end point, properties of the hydrocarbon reactant vary from time to time and ordinarily there is a small portion of the hydrocarbon reactant which is not vaporized and which is introduced into the furnace in the form of unvaporized droplets. If these unvaporized droplets are not blown out beyond the refractory face as they leave the hydrocarbon reactant inlet tube they tend to dribble off the end thereof and deposit on the hot refractory surrounding the inlet tube and form coke deposits. As the deposits of coke build up, the air sheath surrounding the hydrocarbon inlet tube is deflected so that the hydrocarbon reactant ejected from the inlet tube is forced to impinge on the surfaces of the surrounding refractory. The deposition of coke deposits on the refractory results in excessive carbonaceous grit being formed in the carbon black product and, eventually, causes the carbon black furnace to be "blacked out" when the deposits of coke become sufficiently large.

It has been discovered that by constructing the hydrocarbon reactant fluid injector and locating that fluid injector within the furnace, as disclosed in the present invention, that the deposition of carbonaceous material on refractory surfaces within the furnace and upon surfaces of the fluid injector can be substantially eliminated without employing an annular sheath of air surrounding the hydrocarbon reactant fluid injector.

An object of this invention is to provide a novel open end ceramic fluid injector having a venturi-shaped flow constriction disposed near said open end.

Another object of this invention is to provide a means for injecting a substantially vaporized normally liquid hydrocarbon into a carbon black furnace without substantial deposition of coke on either the surfaces of said injector means or the refractory walls of said carbon black furnace.

Another object of this invention is to provide a carbon black furnace having a ceramic hydrocarbon reactant injector means disposed to project into said carbon black furnace from the refractory walls thereof.

Another object of this invention is to provide a carbon black furnace having a hydrocarbon reactant injector means which is not encompassed by an annular sheath of cooling gas.

Another object of this invention is to provide an open end fluid injector in which erosion, deformation and destruction of the parts is substantially reduced.

Another object of this invention is to provide a method of introducing hydrocarbon reactant into a carbon black furnace free from contact with the hot refractory surfaces therein.

Other aspects, objects and the advantages of the invention are apparent from consideration of the accompanying description, the drawings and the appended claims.

According to the invention, there is provided a novel fluid injector comprising an elongated tube having an open discharge end and a venturi-shaped flow constriction disposed within said elongated tube with the diverging portion of said venturi-shaped flow constriction terminating at the open end of said elongated tube. Flow of vaporized hydrocarbon reactant through the injector of this invention is discharged through the venturi-shaped flow constriction as a jet stream so that vaporized and unvaporized hydrocarbon reactant do not impinge or contact surfaces of the injector which are exposed to high temperatures from within the furnace. Thus, the only contact of unvaporized and vaporized hydrocarbon reactant with solid surfaces within the injector of this invention is the venturi-shaped flow constriction which is located sufficiently removed from the open end of the injector tube as to be protected from elevated temperatures.

In one embodiment of the invention, the fluid injector of this invention is constructed with the venturi-shaped flow constriction as an integral part thereof. In this embodiment, there is provided a fluid injector comprising an elongated tube having a cylindrically shaped bore terminating in a venturi-shaped flow constriction at the open end thereof.

In another embodiment of the invention, the fluid injector of this invention is constructed with a removable venturi-shaped flow constriction. In this embodiment, the fluid injector comprises an elongated tube having a cylindrically shaped bore terminating in a venturi-shaped bore at the open end and a second tube of lesser length than the converging portion of said venturi-shaped bore of said elongated tube, said second tube having a tapered external surface adapted and disposed to fit into said converging portion of said venturi-shaped bore against the throat thereof and said second tube having a venturi-shaped flow constriction therethrough.

As one particular feature of the invention, the fluid injector of this invention is constructed of a refractory or ceramic material such as sillimanite or silicon carbide instead of being constructed of metal.

As another particular feature of the invention, the elongated tube of the fluid injector of this invention can be constructed with a plurality of tangentially disposed holes through the wall of said elongated tube adjacent the open end thereof to allow aspiration of tangential air into said elongated tube to burn off any coke which may be deposited on the inner surface of said tube adjacent the open end thereof. These tangentially disposed holes are arranged to slant from the inlet end of said elongated tube on the outside surface thereof to the outlet open end of said elongated tube on the inner surface thereof. Tangentially disposed holes can be used in either of the previously described embodiments of the invention wherein the venturi-shaped flow constriction is either an integral part or a removable part of the elongated tube of the fluid injector. Also, the fluid injector of this invention can be constructed without any tangentially disposed holes if desired.

Also, according to the invention, there is provided a carbon black furnace having an axially disposed hydrocarbon reactant fluid injector projecting into the interior of the furnace for a distance from the end refractory face of the wall of the furnace. The arrangement of the fluid injector in the furnace in this manner permits any unvaporized hydrocarbon reactant to drip into the high velocity gases within the furnace instead of dribbling off on the refractory face surrounding the fluid injector and forming a coke deposit.

In the drawings, FIGURE 1 is an elevational view of a carbon black furnace employing the present invention with parts broken away to show details of construction of the same. FIGURE 2 is a cross-sectional view of the furnace shown in FIGURE 1 taken along line 2—2 of FIGURE 1 looking in the direction indicated. FIGURE 3 is an elevational view, partly in cross-section, of a fluid injector of this invention showing details of construction. FIGURE 4 is an elevational end view of the fluid injector of FIGURE 3 looking from the open discharge end of said injector. FIGURE 5 is a cross-sectional view of a removable venturi-shaped flow constriction for insertion within the elongated tube of the fluid injector of this invention. FIGURE 6 is a cross-sectional view of another removable, venturi-shaped flow constriction. FIGURE 7 is a cross-sectional view of the removable venturi-shaped flow constriction shown inserted in place in FIGURE 3. FIGURE 8 is an end view of the discharge end of the removable venturi-shaped flow constriction of FIGURE 7. FIGURE 9 is a cross-sectional view of the discharge end of a fluid injector having tangentially disposed holes near the open end. FIGURE 10 is a cross-sectional view taken along line 10—10 in FIGURE 9. FIGURE 11 is a cross-sectional view taken along line 11—11 in FIGURE 9.

In FIGURE 1 is shown a carbon black furnace generally designated as 11, which in general arrangement is similar to that shown in Krejci 2,564,700 mentioned above. This type of furnace is chosen for illustrative purposes, but obviously the invention applies equally well to any of the carbon black furnaces shown in the above patents listed, or to any other type of carbon black furnace having a heat-insulated body 12 with a reaction chamber 13 therein.

While the entire furnace body could be made out of a ceramic material of any type, it is preferred to construct the furnace out of a less expensive heat-insulating material 12, such as a castable heat-insulating cement, and line the same with a layer of more expensive, more heat-resistant blocks of ceramic 14. Metallic housing 16 is provided around the outside of the furnace and may be fastened together by any suitable means, such as nuts and bolts (not shown). Metallic housing 16 includes end plates 17 and 18 to which a metal supply pipe 19 and outlet pipe 20 may be secured by suitable means, such as by welding.

Hydrocarbon reactant for conversion into carbon black is passed from oil tank 21 by pump 22 through line 23 into oil heater 24 where the hydrocarbon reactant is vaporized by heat generated by the combustion of gas supplied through line 25. The vaporized hydrocarbon reactant passes from heater 24 through line 26 and valve 27 to nipple 28 which is attached to supply pipe 19 by means of flanges 29 and 30. Air compressed by compressor 31 is supplied through line 32 and valve 33 which is attached to nipple 28 by means of T 34, nipple 35 and T 36. Sight glass 37 is mounted through conduit 38 to one end of T 34 so as to provide a view into reaction chamber 13 through T 34, nipple 35, T 36, nipple 28 and supply pipe 19. The embodiment shown in this drawing is only an example of one embodiment of the invention and air may not be supplied through line 32 in all operations or in some embodiments. Either air is passed through inlets 49 and 50 to combine with the vaporized hydrocarbons in precombustion chamber 48, or hydrocarbons are burned in the tangential inlets 49 and 50 and the hot combustion products formed passed into the precombustion chamber 48 to supply heat for the formation of carbon black by the decomposition of the hot hydrocarbons passing from the axial inlet into the furnace.

Water spray quench 39 connected to outlet 20 downstream thereof and communicating therewith cools the effluent gases by the introduction of quench water through pipes 40. The present invention being in the furnace, the equipment employed downstream may be any such that is known in the carbon black art. For purposes of illustration, a right angle bend 41 is shown attached to quench 39 and is provided with a peephole tube 42. Bend 41 is connected in series to reducer 43, conduit tube 44, and any known means 45 for separating solid carbon black in pipe 46 from the off gas in pipe 47.

Returning to the construction of furnace 11, reaction chamber 13 can be constructed as a single cylindrical chamber or it can be constructed as shown in FIGURES 1 and 2 with a portion 48 of enlarged diameter serving as a precombustion zone. Reaction chamber 13 and/or precombustion zone 48 is provided with one or more fluid inlets 49 and/or 50. Ceramic lining plates or tubes 14 define reaction chamber 13 and ceramic lining plates or tubes 51 define precombustion chamber 48. The ends of precombustion chamber 48 are defined by annular ceramic plates 52 and 53. Ceramic tube 54 provides an opening between precombustion chamber 48 and axially disposed supply pipe 19 within which the fluid injector of this invention is located.

Details of construction of fluid inlets 49 and 50 and related parts are shown in FIGURE 2. Inlets 49 and 50 are ceramic tubes disposed approximately tangent to the inner cylindrical surface of ceramic tube 51. As shown in FIGURE 2, ceramic tube 55 defines tangential inlet 49 and is arranged with its outlet end tangential to the inner surface of ceramic lining 51. Ceramic tube 55 is encompassed with heat refractory material 12 and enclosed within cylindrical metal housing 56 secured to metal housing 16, preferably by welding. The end of tangential inlet 49 is closed by metal plate 57 secured to metal housing 56, preferably by welding. Air is supplied to tangential inlet 49 through pipe bend 58 secured to end plate 57 by welding. Fuel gas is supplied by pipe 59 mounted centrally within tangential inlet 49 by insertion through the bend of pipe bend 58. The construction of tangential inlet 50 is similar to the construction of tangential inlet 49 and is not described here.

Details of construction of the fluid injector 60 shown in place in a carbon black furnace in FIGURE 1 are shown in FIGURES 3–11. As shown in FIGURE 3, fluid injector 60 comprises an elongated cylindrical tube 61 having a substantial cylindrical bore 62 terminating in a venturi-shaped bore 63 at its open end. Lugs or spacers 64 are provided on the outer surface of elongated tube 61 for supporting the tube 61 in place in axial supply pipe 19 and ceramic tube 54, as shown in FIGURE 1. The outer diameter of elongated tube 61 is somewhat less than the inner diameter of axial supply pipe 19 and ceramic tube 54 in order to provide space for elongated tube 61 to be inserted and positioned therein. Ceramic flange 65 is attached to the inlet end 66 of elongated tube 61 to permit securing elongated tube 61 within axial supply pipe 19 and ceramic tube 54 by positioning of ceramic flange 65 between flanges 29 and 30, as shown in FIGURE 1. The venturi-shaped bore 63 of the outlet end 67 of elongated tube 61 comprises a converging portion 68 and a diverging portion 69.

FIGURES 3 and 4 show the removable venturi-shaped flow constriction of FIGURE 7 in place near the outlet end 67 of elongated tube 61. Removable venturi-shaped flow constriction 70 comprises a ceramic tube of length somewhat shorter than the length of converging portion 68 of the venturi-shaped bore 63 of elongated tube 61. The outer surface 71 of removable venturi-shaped flow constriction 70 is tapered to correspond to the taper of converging portion 68 of tube 61. The venturi-shaped bore 72 of flow constriction 70 has a throat diameter which is $8/27$ of the internal diameter of cylindrical bore 62 of elongated tube 61 and a diverging portion 73 having a slope of 3.5° from the horizontal; that is, a total angle of divergence of 7°. Flow constriction 70 is readily removable from within elongated tube 61 through inlet end 66 and is held in place against the converging surface 68 by the fluid pressure of the hydrocarbon reactant flowing through cylindrical bore 62 and throat 72 of flow constriction 70.

An end view of removable flow constriction 70 is shown in FIGURE 8.

The venturi-shaped bore of removable flow constriction 70 can comprise various dimensions and configurations and the configuration of FIGURE 7 is merely one example. Two additional examples are shown in FIGURES 5 and 6. In FIGURE 5, throat 72 of removable flow constriction 70 has a diameter of $12/27$ of the internal diameter of cylindrical bore 62 of elongated tube 61. The taper of the diverging portion 73 has an angle of 3.5° from the horizontal, as does the flow constriction shown in FIGURE 7. In the example of FIGURE 6, throat 72 of flow constriction 70 has a diameter which is $16/27$ of the internal diameter of cylindrical bore 62 of elongated tube 61 and the diverging portion 73 of the venturi has an angle approximating 0° from the horizontal. In each of FIGURES 5 and 6, the length of flow constriction 70 is somewhat smaller than the length of the converging portion 68 of the venturi-shaped bore 63 of elongated tube 61.

The positioning of fluid injector 60 within the carbon black furnace so as to have the discharge end 67 of elongated tube 61 projecting into the open portion of the furnace is shown in FIGURE 1. The projection of discharge end 67 of elongated tube 61 from the face of refractory plate 52 can vary over a wide range from a very small distance to a substantial difference. Preferably, the projection of elongated tube 61 into the furnace is a distance amounting to ¼ of the length of precombustion chamber 48. Ordinarily, elongated tube 61 is never inserted into a furnace for a distance greater than the length of the precombustion zone. In any furnace, including those furnaces in which combustion chambers of enlarged diameters are not used, the projection of the discharge end 67 of elongated tube 61 is for a distance within the range from 0.5 to 12″ from the inner face of end refractory 52.

In FIGURES 9, 10 and 11 is shown another embodiment of the fluid injector of this invention. In FIGURE 9 is shown a portion of a fluid injector which is used without a removable venturi-shaped flow constriction. In this embodiment, cylindrical bore 62 of elongated tube 61 has a venturi-shaped bore 63 as an integral part thereof. Also shown in FIGURE 9, together with FIGURES 10 and 11, is a series of tangentially disposed holes 74 located adjacent discharge end 67 of elongated tube 61 in the divergent portion 69 of venturi-shaped bore 63. As shown in the embodiment of FIGURE 9, six tangentially disposed holes are arranged in two rows of three holes each. Other arrangements and numbers of hole 74 can be used and the arrangement shown in FIGURES 9–11 is merely an example. Holes 74 are also disposed on a slant so that the axis of each hole 74 forms an acute angle toward the inlet end of elongated tube 61 with the outer surface thereof. The slant of tangentially disposed hole 74 can be any angle between 10° and 85° and preferably is an angle between 30° and 60°. In the embodiment of FIGURE 9, the slant is at an angle of 45°.

Tangentially disposed holes 74 located adjacent discharge end 67 of elongated tube 61 provide for the aspiration of air from within the combustion zone and/or reaction zone for removal of any coke which may be deposited upon diverging surface 69. Although removable flow constriction 70 is not shown in place in the embodiment of FIGURE 9, removable flow constriction 70 can be used in combination with tangentially disposed holes 74.

In operation, hydrocarbon reactant, such as gas oil, is heated in oil heater 24 to substantially vaporize all the reactant. By substantially vaporized, it is intended to cover all mixtures of from 80% vapor and 20% liquid up to 100% vapor. The substantially vaporized hydrocarbon reactant flows through line 26, valve 27, T 36, nipple 28 and axial supply pipe 19 into the inner cylindrical bore 62 of elongated tube 61. The venturi section of removable flow constriction 70 shown in FIGURE 3 or the venturi section 63 formed as an integral part of elongated tube 61 shown in FIGURE 9 effects compression of the vapor flowing through cylindrical bore 62 so that the vapor is discharged from the throat of the venturi as a jet of vapor having an angle of divergence of approximately 7°. Since discharge end 67 of elongated tube 61 has a divergent portion 69, having an angle of divergency of approximately 7°, the vapor discharge from the throat of the venturi has no opportunity to contact the divergent surfaces 69 of the elongated tube. Likewise, any unvaporized hydrocarbon reactant present in the vapor does not have any opportunity to contact divergent surface 69 of elongated tube 61. Thus, the last contact of vaporized and unvaporized hydrocarbon reactant is with converging surface 68 which is located a sufficient distance from discharge end 67 of elongated tube 61 that said surface 68 is relatively cool and carbon deposits are not formed.

In the embodiment of FIGURE 6 wherein a removable flow constriction 70, having divergent surface 73 wherein the angle between opposite walls of divergent surface 73 is substantially less than 7°, the divergent angle of the vaporized and unvaporized hydrocarbon reactant from the throat of the venturi is very small in comparison to the angle of divergency of divergent surface 69 of elongated tube 61.

As shown in FIGURE 1, discharge end 67 of elongated tube 61 projects into combustion zone 48 for a distance from the inner surface of end refractory 52 so that any unvaporized hydrocarbon reactant flowing in cylindrical bore 62 and not emitted with sufficient force to be thrown out into the open volume of combustion zone 48 or reaction zone 13 falls from discharge end 37 into the high velocity tangential gases entering through tangential inlets 49 and 50. Thus, unvaporized hydrocarbon reactant has no opportunity to contact any of the hot refractory linings within the combustion and reaction zones of the furnace. In normal operation, all unvaporized liquid flowing in cylindrical bore 62 of the fluid injector will be emitted with sufficient force as to be thrown into reaction chamber 13 and the falling or dropping of unvaporized hydrocarbon reactant from the discharge end 67 of elongated tube 61 occurs only in starting up and closing down the carbon black furnace.

If, under any conditions of operation, carbonaceous deposits are formed on divergent surface 69 or any of the other surfaces of elongated tube 61 exposed to elevated temperatures, such carbon deposits can be observed from peephole 42 located in the discharge section of the furnace. These carbon deposits can then be removed by closing off the flow of vaporized hydrocarbon reactant with valve 27 and supplying air through line 32 into the hot furnace by opening valve 33. The removal of carbonaceous deposits can be observed through sight glass 37 during this combustion step.

When a fluid injector of the design shown in FIGURE 9 is used wherein tangentially disposed holes 74 are provided in the divergent portion of elongated tube 61 adjacent the discharge end 67 thereof, substantially no carbonaceous deposits on divergent surface 69 are encountered since discharge end 67 of elongated tube 61 is located a sufficient distance in combustion zone 48 from the inner surface of end refractory 52 that air is aspirated by the flow of vapor into discharge end 67 of elongated tube 61 to remove any carbon deposits which may have formed.

It has been found that the venturi-shaped flow constriction adjacent the discharge end of elongated tube 61 is effective in preventing any unvaporized hydrocarbon reactant lying on the bottom surface of cylindrical bore 62 from rolling out discharge end 67 of the fluid injector onto the refractory. However, if any unvaporized hydrocarbon reactant does drip from discharge end 67 of elongated tube 61, it falls into the bottom of the furnace because of the projection of the discharge end of elongated tube 61 into the furnace. Therefore, unvaporized hydrocarbon reactant has no opportunity to accumulate around discharge end 67 of the fluid ejector and form carbon deposits which affect or alter the flow of vaporized hydrocarbon reactant from the fluid injector. The venturi-shaped flow constriction within elongated tube 61 provides for ejection of vaporized hydrocarbon reactant, as well as any unvaporized hydrocarbon reactant which it may contain, for a substantial distance into the furnace. Thus, it is not necessary to encompass the fluid injector device of this invention with a sheath of air for the purpose of carrying the incoming hydrocarbon reactant into the furnace.

The embodiment of this invention providing for removable type venturi flow constriction tubes is very advantageous since the throat of the venturi is exposed to the highest fluid velocities, as well as elevated temperatures, so that this portion of the fluid injector is subject to more rapid deterioration than are other parts. As shown in FIGURE 3, removable flow constriction 70 can be readily removed from inlet end 66 of elongated tube 61 by separating flanges 29 and 30 (shown in FIGURE 1) which hold it in place. By constucting flow constriction 70 with an inwardly downstream taper, flow constriction 70 can be seated on converging portion 68 of tube 61 and held in place by fluid pressure without being forced into the furnace.

The process of the invention, when using the refractory tube illustrated in FIGURE 9, was performed and the process conditions and results obtained are the following.

Oil of 11.6 API gravity and a Bureau of Mines correlation index of 91.9 at the rate of 140 g.p.h. was passed through oil heater 24 and heated to 775° F. The oil from oil heater 24 was passed through injector 60 and hydrocarbon constriction 70 into precombustion chamber 48. Gas was burned in the tangential inlets 49 and 50 at the rate of 3200 c.f.h. Air at the rate of 48,000 c.f.h. was passed into inlets 49 and 50 to supply oxygen for the combustion. A temperature of about 2600° F. was provided in the precombustion section. The effluent from reaction chamber 13 passed through quench 39 where water was sprayed at the rate of about 210 g.p.h. The quenched effluent at a temperature of 1100° F. passed into separation zone 45 where carbon black was separated from gases. 4.0 pounds of carbon black are obtained per gallon of axial oil feed. Carbon did not deposit on the inside of the refractory fluid injector. Air was not admitted with the oil feed.

Reasonable variation and modification are possible within the scope of the foregoing disclosure, drawings and the appended claims of this invention, the essence of which is that there is provided an improved ceramic fluid injector and method for introducing hydrocarbon reactant axially into a carbon black furnace free from deposition of coke on the refractory surfaces of said fluid injector and/or said furnace, said fluid injector having a venturi-shaped flow constriction adjacent the discharge end thereof within the flow passage of said fluid injector, said venturi-shaped flow constriction being constructed as either as integral part of said fluid injector or as a removable part thereof, and a carbon black furnace having said fluid injector disposed therein with the discharge end of said fluid injector projecting within said furnace from the end wall thereof.

I claim:
1. A fluid injector for a carbon black furnace comprising, in combination, a first ceramic tube constructed and disposed to fit a fluid inlet of said furnace, a second elongated ceramic tube having a cylindrically-shaped bore terminating in a venturi-shaped bore adjacent the open discharge end of said second elongated ceramic tube adapted to be disposed within said first ceramic tube, and a removable third ceramic tube of lesser length than the converging portion of said venturi having a tapered external surface adapted and disposed to fit into said converging portion adjacent the throat of said venturi, said third ceramic tube having a venturi-shaped bore therethrough for the ejection of at least partially vaporized hydrocarbon reactant free from contact with the diverging surfaces of said venturi-shaped bores in said second and third ceramic tubes.

2. The combination of claim 1 wherein the diverging surface of said venturi-shaped bore of said third ceramic tube is the same taper as the diverging surface of said venturi-shaped bore of said second elongated ceramic tube.

3. The combination of claim 2 wherein the included angle of the diverging portion of said venturi-shaped bores is 7°.

4. The combination of claim 1 wherein the length of the converging portion of said venturi-shaped bore of said third ceramic tube is less than the length of the diverging portion thereof.

5. The combination of claim 1 wherein the included angle of the diverging portion of said venturi-shaped bore of said third tube is slightly greater than 0°.

6. The combination of claim 1 wherein the throat of said venturi-shaped bore of said third ceramic tube has a diameter in the range of $8/27$ to $16/27$ of the internal diameter of said cylindrically-shaped bore of said second elongated ceramic tube.

7. A fluid injector for a carbon black furnace comprising, in combination, a first ceramic tube constructed and disposed to fit in a fluid inlet of said furnace and a second elongated ceramic tube having a cylindrically-shaped bore terminating a venturi-shaped bore adjacent the open discharge end of said second elongated ceramic tube adapted to be disposed within said first ceramic tube, said second elongated ceramic tube having a plurality of tangentially disposed fluid inlets adjacent the open discharge end thereof.

8. The combination of claim 7 wherein said tangentially disposed fluid inlets are arranged in multiple circumferential rows in the diverging portion of said venturi-shaped bore of said second elongated ceramic tube.

9. The combination of claim 8 wherein said tangentially disposed fluid inlets are arranged with the axis of said tangentially disposed fluid inlets slanted an an angle in the range of 10°–85° from the outer surface of said second elongated ceramic tube toward the outlet end of said second elongated ceramic tube.

10. The combination of claim 9 wherein said tangentially disposed fluid inlets are six in number with three of said tangentially disposed fluid inlets arranged in each circumferential row.

11. A fluid injector for a carbon black furnace comprising, in combination, a first ceramic tube constructed and disposed to fit in a fluid inlet of said furnace, a second elongated ceramic tube having a cylindrically-shaped bore terminating in a venturi-shaped bore adjacent the open discharge end of said second elongated ceramic tube adapted to be disposed within said first ceramic tube, said second elongated ceramic tube having a plurality of tangentially disposed fluid inlets adjacent the open discharge end of said second elongated ceramic tube, and a removable third ceramic tube of lesser length than the converging portion of said venturi having a tapered external surface adapted and disposed to fit into said converging portion adjacent the throat of said venturi, said third ceramic tube having a venturi-shaped bore therethrough for the injection of at least partially vaporized hydrocarbon reactant free from contact with the diverging surfaces of said venturi-shaped bores in said second and third ceramic tubes.

12. The combination of claim 11 wherein said tangentially disposed fluid inlets are arranged in multiple circumferential rows in the diverging portion of said venturi-shaped bore of said second elongated ceramic tube.

13. In a carbon black furnace comprising, in combination, a heat insulating body having an elongated cylindrical reaction chamber therein, said reaction chamber having an inlet end and an outlet end; a metallic housing around said heat insulating body; and tangentially disposed fluid inlets located adjacent the inlet end of said reaction chamber for introducing combustible gas and air and forming a layer of high velocity combustion gases adjacent the cylindrical wall of said reaction chamber; the improvement comprising an axially disposed hydrocarbon reactant inlet comprising a first ceramic tube arranged in the inlet end of said reaction chamber; a fluid injector comprising a second ceramic tube fitted in said first ceramic tube with the open discharge end of said second ceramic tube extending into the open space of said reaction chamber beyond the inner end wall of said reaction chamber, said second ceramic tube having a cylindrically-shaped bore terminating in a venturi-shaped bore adjacent the open discharge end of said second ceramic tube for ejecting at least partially vaporized hydrocarbon reactant axially into said reaction chamber free from contact with the diverging portion of said venturi; a first metal supply pipe for said hydrocarbon reactants secured to said metallic housing around and in communication with the cylindrically-shaped bore of said second ceramic tube; and an outlet means disposed adjacent the outlet end of said reaction chamber for removing carbon black product and combustion gases.

14. The combination of claim 13 wherein the open discharge end of said second ceramic tube extends into said reaction chamber for a distance of from 0.5″ to 12″.

15. In a carbon black furnace comprising, in combination, a heat insulating body having an elongated cylindrical reaction chamber therein, said reaction chamber having an inlet end and an outlet end and a precombustion zone of enlarged diameter arranged adjacent the inlet end of said reaction chamber; a metallic housing around said heat insulating body; and tangentially disposed fluid inlets located in said precombustion zone of said reaction chamber for introducing combustible gas and air and forming a layer of high velocity combustion gases adjacent the cylindrical wall of said reaction chamber; the improvement comprising an axially disposed hydrocarbon reactant inlet comprising a first ceramic tube arranged in the inlet end of said reaction chamber; a fluid injector comprising a second ceramic tube fitted in said first ceramic tube with the discharge end of said second ceramic tube extending into said precombustion zone of said reaction chamber beyond the inner end wall of said reaction chamber, said second ceramic tube having a cylindrically-shaped bore terminating in a venturi-shaped bore adjacent the open discharge end of said second ceramic tube, and a removable third ceramic tube of lesser length than the converging portion of said venturi having a tapered external surface adapted and disposed to fit into said converging portion adjacent the throat of said venturi, said third ceramic tube having a venturi-shaped bore therethrough for the injection of at least partially vaporized hydrocarbon reactant axially into said reaction chamber free from contact with the diverging surfaces of said venturi-shaped bores of said second and third ceramic tubes; a first metal supply pipe for said hydrocarbon reactant secured to said metallic housing around and in communication with the cylindrically-shaped bore of said second ceramic tube; and an outlet means disposed adjacent the outlet end of said reaction chamber for removing carbon black product and combustion gases.

16. The combination of claim 15 wherein the open discharge end of said second ceramic tube extends into said reaction chamber for a distance amounting to ¼ the length of said precombustion zone.

17. The method of axially introducing substantially vaporized normally liquid hydrocarbon reactant into a carbon black furnace, said method comprising, forming a stream of said reactant within a fluid inlet means, passing said stream of reactant through a venturi-shaped bore within said fluid inlet means adjacent the open discharge end thereof thereby first compressing said stream of reactant within said fluid inlet means, then expanding said compressed stream of reactant within said fluid inlet means, and finally discharging said expanded stream of reactant from said fluid inlet means through said open discharge end into the reaction zone of said carbon black furnace free from further contact with said inlet means.

18. The method of axially introducing substantially vaporized normally liquid hydrocarbon reactant into a carbon black furnace through an inlet means without deposition of coke on the refractory surfaces of said furnace or on the surfaces of said inlet means, said method comprising, in sequence, directing said reactant through an elongated confined zone of laminar flow in said inlet means, passing said stream of reactant through a venturi-shaped bore adjacent the open discharge end thereof thereby first directing said reactant through a compression zone defined by the converging portion of said venturi-shaped bore wherein the flow velocity is increased, then directing said reactant through an expansion zone defined by the diverging portion of said venturi-shaped bore wherein a conical jet of reactant is formed, and finally discharging said conical jet of reactant from said inlet means through said open discharge end into the reaction zone of said carbon black furnace free from further contact with said inlet means and the refractory surfaces of said carbon black furnace.

19. The method of claim 18 wherein the point of said discharging of said conical jet of reactant from said inlet means is at a distance removed from the refractory surface through which said reactant is introduced.

References Cited in the file of this patent
UNITED STATES PATENTS

| | | |
|---|---|---|
| 1,685,488 | Huff | Sept. 25, 1928 |
| 2,353,865 | Armstrong | July 18, 1944 |
| 2,357,901 | Lewis et al. | Sept. 12, 1944 |
| 2,641,534 | Krejci | June 9, 1952 |
| 2,760,847 | Oblad et al. | Aug. 28, 1956 |
| 2,781,247 | Krejci | Feb. 12, 1957 |
| 2,785,053 | Larson et al. | Mar. 12, 1957 |
| 2,809,098 | Larson | Oct. 8, 1957 |
| 2,823,243 | Robinson | Feb. 11, 1958 |